United States Patent [19]

Schepers et al.

[11] Patent Number: 4,742,116

[45] Date of Patent: May 3, 1988

[54] THERMOPLASTIC MOULDING COMPOUND

[75] Inventors: Herman A. J. Schepers, Stein; Wilhelmus A. M. Debets, Sittard, both of Netherlands

[73] Assignee: Stamicarbon B.V., Geleen, Netherlands

[21] Appl. No.: 808,651

[22] Filed: Dec. 13, 1985

Related U.S. Application Data

[63] Continuation of Ser. No. 656,465, Oct. 1, 1984, abandoned.

[30] Foreign Application Priority Data

Oct. 1, 1983 [NL] Netherlands .......................... 8303378

[51] Int. Cl.$^4$ ...................... C08L 25/08; C08L 25/14; C08L 51/04; C08L 51/06
[52] U.S. Cl. ........................................ 525/74; 525/75; 525/84; 525/207
[58] Field of Search ............................................ 525/74

[56] References Cited

U.S. PATENT DOCUMENTS

| | | | |
|---|---|---|---|
| 3,859,266 | 1/1975 | Carlos et al. | 525/195 |
| 3,959,405 | 5/1976 | Labana et al. | 525/207 |
| 4,444,950 | 4/1984 | Sakano et al. | 525/74 |
| 4,452,948 | 6/1984 | Marrion et al. | 525/207 |

FOREIGN PATENT DOCUMENTS

| | | | |
|---|---|---|---|
| 3140565 | 4/1983 | Fed. Rep. of Germany | 525/74 |
| 3140566 | 4/1983 | Fed. Rep. of Germany | 525/74 |

*Primary Examiner*—Carman J. Seccuro
*Attorney, Agent, or Firm*—Cushman, Darby & Cushman

[57] ABSTRACT

A thermoplastic moulding compound based on a rubber-modified copolymer consisting of styrene and/or α-methylstyrene and maleic anhydride, wherein the moulding compound is composed of a mixture of:

A. 50–95% (wt) of a copolymer consisting of:
  (i) 50–95% (wt) styrene and/or α-methylstyrene,
  (ii) 50–5% (wt) maleic anhydride,
  (iii) 0–20% (wt) acrylate,
  (iv) 0–20% (wt) acrylonitrile;
B. 5–50% (wt) of an ethylene-propylene modified rubber or ethylene-propylene-diene modified rubber, the rubber being modified by grafting thereto a compound containing hydroxyl, amide or amine groups; and
C. 0–30% (wt) of an ethylene-propylene rubber or an ethylene-propylene-diene rubber.

20 Claims, No Drawings

THERMOPLASTIC MOULDING COMPOUND

This is a continuation, of application Ser. No. 656,465, filed Oct. 1, 1984, now abandoned.

The present invention relates to a thermoplastic moulding compound based on a rubber-modified copolymer based on styrene and/or α-methylstyrene and maleic anhydride.

BACKGOUND OF THE INVENTION

Copolymers from styrene and maleic anhydride are already known (SMA). These copolymers can be prepared by batch processes or in continuous processes. The first commercially available SMA copolymers were low-molecular weight products having molecular weights lower than 5000. These low molecular weight grades were used in, for instance, floor shampoos, floor waxes, emulsion paints and dispersing agents.

In addition, the later developed high-molecular SMA copolymers are important, and are used, for instance, in the automotive industry and in domestic articles.

As a result of the copolymerization of styrene with maleic anhydride, SMA copolymers have a greater dimensional stability under heat than polystyrene and styrene-acrylonitrile copolymers. This may be very advantageous. However, since SMA copolymers have a high softening temperature (approximately 220° C.), it is difficult to process such copolymers through extrusion and injection moulding apparatus and the like. Moreover, the mechanical properties of such copolymers, such as impact resistance, are insufficient since SMA copolymers are very brittle. Incorporating a rubber in a SMA copolymers may improve impact-resistance characteristics while sacrificing other desired properties, such as, for instance, the rigidity of the copolymer.

A number of alleged solutions have already been proposed to overcome problems commonly associated with conventional SMA copolymers. For instance, British patent No. 1,315,219 describes mixtures consisting of a (i) copolymer of maleic anhydride, styrene and acrylonitrile, (ii) a copolymer from styrene and acrylonitrile and (iii) a graft copolymer of a mixture from styrene and acrylonitrile grafted on a rubber.

Another effort is described in British patent No. 1,316,330 as a mixture of a styrene-acrylonitrile copolymer with a styrene-maleic anhydride-acrylonitrile copolymer.

Another approach is described in U.S. Pat. No. 3,322,853 as a mixture consisting of a graft copolymer comprising a diene rubber substrate and hydroxylic substrate, a styrene-maleic anhydride copolymer having a low molecular weight and a polyepoxide. This mixture is composed of diene rubbers and polyepoxides and is used as a coating or adhesive. The UV resistance and oxidation stability of such a mixture are quite unsatisfactory.

Next, a still further proposal is disclosed in German patent application No. 3,140,565 now laid open for public inspection, which discloses a moulding compound consisting of 50 to 90% (wt) of a copolymer which consists of 65 to 90% (wt) of a monovinylaromatic monomer, 5 to 35% (wt) of an unsaturated dicarboxylic anhydride and of 10 to 50% (wt) of a rubber composed from a monomer from the group of the conjugated dienes, alkylacrylates, monovinyl aromatics, vinyl ethers or ethylene, propylene and a non-conjugated diene and further an ethyl-unsaturated monomer with an —OH, —SH or —NHR group. This moulding compound, however, has an undesirably low impact resistance.

SUMMARY AND OBJECTS OF THE INVENTION

The moulding compounds according to the invention are broadly characterized as comprising a mixture of (i) 50–95 wt. % of a copolymer of styrene and/or methylstyrene-maleic anhydride, (ii) 5–50 wt % of a modified ethylene-propylene rubber, or ethylene-propylene-diene rubber, and (iii) 0–30 wt. % of an ethylene-proylene rubber or ethylene-proylene-diene rubber.

The present invention provides a thermoplastic moulding compound based on a rubber-modified copolymer of styrene and/or α-methylstyrene and maleic anhydride which has, for instance, high impact resistance, superior UV resistance, superior oxidation stability, and high stability. This composition essentially overcomes defects associated with conventional SMA copolymer based thermoplastic moulding compositions.

The invention also provides an object wholly or partly produced from a moulding compound as described above.

DETAILED DESCRIPTION

The present moulding composition comprises a mixture, i.e. blend, of:

A. about 50 to about 95% (wt) of a copolymer consisting of:
  (i) about 50 to about 95% (wt) styrene and/or α-methylstyrene
  (ii) about 50 to about 5% (wt) maleic anhydride
  (iii) about 0 to about 20% (wt) acrylate
  (iv) about 0 to about 20% (wt) acrylonitrile;
B. about 5 to about 50% (wt) of an ethylene-propylene rubber or ethylene-propylene-diene rubber modified by grafting with a compound containing hydroxyl, amide or amine groups; and
C. about 0 to about 30% (wt) of an unmodified ethylene-propylene rubber or ethylene-propylene-diene rubber.

This moulding compound may contain conventional additives such as stabilizers, antioxidants, antistatics, lubricants, fillers, colourants, pigments, and the like.

Surprisingly it has been found that, in addition to a good UV resistance, such a moulding compound also has an excellent impact resistance, dimensional stability under heat and rigidity. Moreover, it is now possible to use an ethylene-propylene rubber or an ethylene-propylene-diene rubber which can be produced in large scale quantity after only minor modifications.

Unexpectedly, the use of EP or EPT rubbers with non-conjugated dienes, rubbers with few or no unsaturations in the main chain, provides mixtures according to the invention having superior UV resistance and oxidation stability.

The mixture preferably contains about 65 to about 95% (wt) of copolymer A and about 5 to about 35% (wt) of the modified rubber B.

The copolymer based on styrene and/or α-methylstyrene and maleic anhydride consists of:
  (i) about 50 to about 95% (wt) styrene and/or α-methylstyrene,
  (ii) about 50 to about 5% (wt) maleic anhydride,
  (iii) about 0 to about 20% (wt) acrylate, and
  (iv) about 0 to about 20% (wt) acrylonitrile.

Preferably, copolymer "A" contains about 65 to about 90% (wt) styrene and/or α-methylstyrene, and about 10 to about 35% (wt) maleic anhydride.

The copolymers used in the invention have a weight-average molecular weight between 30,000 and 500,000 and preferably between 100,000 and 400,000. The weight average molecular weight ($\overline{M}_w$) can be determined in accordance with a method described in Journal of Applied Polymer Science, Vol. 20, 1619–1626 (1976), the disclosure of which is hereby incorporated by reference. A method has been developed for determining the weight average molecular weight ($=\overline{M}_w$) by a single calibration curve (by determining the intrinsic viscosity at 25.0° C. in tetrahydrofuran). For maleic anhydride percentages of 5–50 moles % and an $\overline{M}_w$ range of $2\times 10_4$ to $7\times 10_6$, the following equation is applicable:

$$\eta = 3.98 \cdot 10_{-4} \cdot \overline{M}_w 0.596,$$

where:
$\eta$ = intrinsic viscosity
$\overline{M}_w$ = weight average molecular weight.

The copolymers of styrene and/or α-methylstyrene and maleic anhydride are known and are generally described in available literature. The copolymers are prepared according to customary processes such as mass polymerization or polymerization in solution. These copolymers of styrene and maleic anhydride can, for instance, be obtained by reacting the two monomers, styrene and maleic anhdyride, with each other in the presence of benzoyl peroxide. The polymerization rate can be controlled much better when a solvent is used. Suitable exemplary solvents include, for instance, acetone, toluene, xylene, dioxane or methyl ethyl ketone.

A 50:50 (molar) - copolymer can be obtained by discontinuous copolymerization of styrene and maleic anhydride, for instance by precipitation polymerization of styrene and maleic anhydride in aromatic solvents. Copolymers having less maleic anhydride can be obtained in a continuous copolymerization process if an amount of a mixture composed of excess styrene to maleic anhydride is fed at high temperatures into a polymerization vessel with vigorous stirring while simultaneously removing a little quantity of polymerization mixture from the vessel. The disclosure of A. W. Hanson and R. L. Zimmermann, Industrial Engineering Chemistry 49, page 1803, 957, is hereby incorporated by reference.

For a terpolymer, the styrene-maleic anhydride copolymer may contain 0–20% (wt) acrylonitrile or an acrylate such as, for instance, methyl methacrylate or ethyl acrylate.

Suitable rubbers which can be used have few or no unsaturations in their main chain, i.e. ontain fewer than 2 and preferably fewer than 1.5 double bonds per 1000 carbon atoms. As rubbery largely saturated polymers, the rubbers may be branched or have side chains which can be employed for crosslinking purposes.

Particularly suitable rubbers useful in the composition of the invention are ethylene-propylene copolymers (the so-called EP rubbers) and preferably ethylene-propylene copolymers copolymerized with other polyunsaturated monomers (the so-called EPT rubbers), or mixtures of two or more of these rubbers. Examples of suitable polyunsaturated monomers include hexadiene-1,4 dicyclopentadiene, tricyclopentadiene, 5-vinylnorbornene-2, 5-ethylidene-norbornene-2, 5-methylene-norbornene-2, 5-(2-propenyl)norbornene-2, 5-(5-hexenyl)norbornene-2, 4,7,8,9-tetrahydroindene and sipropylidenetetrahydroindene. The preparation of exemplary rubbers is described in laid open Netherlands patent applications No. 6806893 and 300585, the disclosures of which are hereby incorporated by reference.

The rubbers are modified with hydroxyl groups, amide groups or amine groups. Hydroxyl groups can, for instance, be incorporated in the rubbers via a number of processes. For instance, the hydroxyl groups may be incorporated in the ethylene-propylene or ethylene-propylene-diene rubbers by grafting the rubber with a hydroxyl functional monomer, such as 2-hydroxyethylacrylate, 2-hydroxypropyl-acrylate and the corresponding methacrylates, alcohols, such as allylalcohol and vinylbenzylalcohol.

Preferably an ethylene-propylene-diene rubber is modified with hydroxyl groups by grafting 2-hydroxyethylmethacrylate (HEMA) in a 10%-xylene solution of the EPT rubber. The number of OH-groups in the EP to EPT rubber is generally more than 0.01% (wt), preferably 0.05 to 10% (wt) (calculated on the modified EP or EPT rubber). EPT rubbers with different HEMA percentages can be obtained by varying the HEMA concentrations or by using different grafting times. The resulting product is subsequently purified by, for instance, extraction. The number of amine groups in the EP or EPT rubber is generally from 0.05 to 10% (wt). The number of amide groups in the EP or EPT rubber is generally 0.05 to 10% (wt).

The modified EP or EPT rubber can be mixed with the SMA matrix in a conventional mixing device such as, for example, a single or twin-screw extruder, an impeller mixer, a Banbury mixer, or in roll mills.

0–30% (wt) ethylene-propylene or ethylene-propylene-diene rubber can be added. Advantageously, about, 5 wt % to about 20 wt % of such rubbers are employed.

A reaction accelerator can be added during the reaction. Preference is given to adding 0.01–10% (wt) of the reaction accelerators, calculated on the total mixture. Examples of suitable accelerators are dibutyltinmaleate, tetrabutoxytitanium, magnesiumstearate, zincstearate, calciumstearate and/or aluminumstearate.

Advantageously, the components are mixed at a temperature between about 160° C. and about 290° C.

The present moulding compounds are suitable for many applications such as, for instance, the manufacture of tubes, bottles, furniture, dashboards for motor cars, casings and housings for electronic and domestic devices, shoe heels, caravans, skis and surf boards.

The invention is further elucidated by means of the following non-limiting examples and comparative experiments.

EXAMPLES

EXAMPLES 1 THROUGH 4 AND COMPARATIVE EXAMPLES a AND b

The following were supplied to a roll mill consisting of two rolls, diameter 80 mm and width 200 mm, with a friction of 1:1.2. 45 parts by weight SMA (MA content 14 (wt) % and $\overline{M}_w$ 250,000), 15 parts by weight OH-modified EPT, 0.2 parts by weight dibutyltinmaleate as reaction accelerator, 0.25 parts by weight octadecyl-3-(3,5-di-ter-butyl-4-hydroxyphenyl) propionate as stabilizer.

The components were subsequently mixed for 20 minutes at a temperature of 180° C. and a speed of 35 rpm.

The EPT rubber was modified with hydroxyl groups by grafting 2-hydroxyethylmethacrylate (HEMA) in a 10% xylene solution of the EPT rubber.

These examples illustrate the influence of different HEMA percentages of the rubber on the properties of the moulding compound. The results are reported in Table 1.

The thus obtained moulding compounds were tested and the impact resistance (ASTM-D-256) rigidity (ASTM-D-790), HDT, unannealed, (ASTM-D-648) were determined. The results are also reported in TABLE 1

TABLE 1

| Example | SMA pts. wt | OH—EPT pts. wt | OH % (wt)* | HEMA % (wt)* | impact resist kJ/m² | rigidity N/mm2 | HDT C° |
|---|---|---|---|---|---|---|---|
| a | 60 | — | — | — | 0.4 | 3650 | 116 |
| b | 45 | 15 | — | — | 1.2 | 1700 | 108 |
| 1 | 45 | 15 | 0.29 | 2.2 | 3.0 | 1600 | 108 |
| 2 | 45 | 15 | 0.60 | 4.6 | 18.0 | 1500 | 108 |
| 3 | 45 | 15 | 0.85 | 6.5 | 20.0 | 1940 | 108 |
| 4 | 45 | 15 | 0.87 | 6.7 | 22.0 | 1950 | 108 |

*calculated on quantity OH—EPT.

These examples clearly show that the moulding compounds according to the invention combine a good impact resistance with a good regidity and dimensional stability under heat.

EXAMPLES 5 THROUGH 7

In the following examples, the preparation process according to Examples 1 through 4 was used. However, the quantities of SMA and OH-modified EPT were varied.

The SMA is the same as in Examples 1 through 4. The EPT rubber, however, was modified with OH groups by grafting 2% allylalcohol (AA) on the EPT rubber.

These moulding compositions were tested and the impact resistance, rigidity, and HDT were determined using the same procedures in Examples 1-4. The results are reported in Table 2.

EXAMPLE 8

The preparation process according was followed except as noted below. 45 parts by weight SMA (MA content 20% (wt) and $\overline{M}_w$ 150,000) was mixed with 15 parts by weight OH-modified EPT rubber. The EPT rubber was modified with OH-groups by grafting 2% allylalcohol on the EPT rubber. Other additions were analogous to those set forth in Examples 1 through 4. The results are reported in Table 2.

TABLE 2

| Example | SMA pts. wt | OH—EPT pts. wt | OH % (wt)* | HEMA % (wt)* | impact resist kJ/m2 | rigidity N/mm2 | HDT C° |
|---|---|---|---|---|---|---|---|
| a | 60 | — | — | — | 0.4 | 3650 | 116 |
| 5 | 51 | 9 | 0.6 | 2 | 2.3 | 2380 | 112 |
| 6 | 48 | 12 | 0.6 | 2 | 15.0 | 1960 | 109 |
| 7 | 45 | 15 | 0.6 | 2 | 20.0 | 1470 | 108 |
| 8 | 45 | 15 | 0.6 | 2 | 11.0 | 1500 | 115 |

*calculated on quantity of OH—EPT.

What is claimed is:

1. A thermoplastic moulding compound based on a rubber-modified copolymer consisting of styrene and-/or α-methylstyrene and maleic anhydride, wherein said moulding compound is composed of a mixture of:
   A. 50-95% (wt) of a copolymer consisting of:
      (i) 50-95% (wt) styrene and/or α-methylstyrene,
      (ii) 50-5% (wt) maleic anhydride,
      (iii) 0-20% (wt) acrylate,
      (iv) 0-20% (wt) acrylonitrile;
   B. 5-50% (wt) of an ethylene-propylene modified rubber or ethylene-propylene-diene modified rubber consisting of said rubber and grafted, by solution polymerization, thereto at least one compound selected from the group consisting of compounds, containing hydroxyl groups, compounds containing amide groups and compounds containing amine groups; and
   C. 0-30% (wt) of an ethylene-propylene rubber or an ethylene-propylene-diene rubber.

2. A moulding compound according to claim 1, wherein said copolymer contains 65-90 weight % styrene and 10-35 weight % maleic anhydride.

3. A moulding compound according to claim 1, wherein said moulding compound contains 65-95% (wt) of said copolymer and 5-35% (wt) of said modified rubber.

4. A moulding compound according to claim 1, wherein copolymer A has a weight-average molecular weight between 30,000 and 500,000.

5. A moulding compound according to claim 1, wherein said copolymer has a weight-average molecular weight between 100,000 and 400,000.

6. A moulding compound according to claim 1, wherein said modified rubber contains hydroxyl groups.

7. A moulding compound according to claim 1, wherein said modified rubber contains amine groups.

8. A moulding compound according to claim 1, wherein said modified rubber contains amide groups.

9. A moulding compound according to claim 1, wherein said modified rubber contains 0.05 (wt) % to 10 (wt) % hydroxyl groups.

10. A moulding compound according to claim 1, wherein said mixture has been prepared in the pressure of 0.01-10 (wt) %, calculated on the total mixture, of a reaction-accelerator.

11. A moulding compound according to claim 10, wherein said reaction-accelerator is dibutytinmaleate, tetrabutoxytitanium, magnesium-stearate, zincstearate, calciumstearate, aluminum-stearate, or a combination thereof.

12. A thermoplastic moulding compound based on a rubber-modified copolymer consisting of styrene and/or α-methylstyrene and maleic anhydride, wherein said moulding compound is composed of a mixture of:
   A. 65–95% (wt) of a copolymer consisting of:
      (i) 65–96% (wt) styrene and/or α-methylstyrene,
      (ii) 10–35% (wt) maleic anyhydride,
      (iii) 0–20% (wt) acryliace,
      (iv) 0–20% (wt) acrylonitrile;
   B. 5–35% (wt) of an ethylene-propylene modified rubber or ethylene-propylene-diene modified rubber consisting of said rubber and grafted, by solution polymerization, thereto at least one compound selected from the group consisting of compounds containing hydroxyl groups, compounds containing amide groups and compounds containing amine groups; and
   C. 5–20% (wt) of an ethyolene-propylene rubber or an ethylene-propylene-diene rubber.

13. A moulding compound according to claim 12, wherein said copolymer has a weight-average molecular weight between 100,000 and 400,000.

14. A moulding compoud according to claim 12, wherein said modified rubber contains hydroxyl groups.

15. A moulding compound according to claim 12, wherein said modified rubber contains amine groups.

16. A moulding compound according to claim 12, wherein said modified rubber contains amide groups.

17. A moulding compound according to claim 12, wherein said modified rubber contains 0.05 (wt) % to 0.10 (wt) % hydroxyl groups.

18. A moulding compound according to claim 12, wherein said mixture has been prepared in the presence of 0.01–10 (wt) %, calculated on the weight of the total mixture, of a reaction-accelerator.

19. A moulding compound according to claim 6 wherein said modified rubber containing hydroxyl groups is modified by grafting thereto a compound containing hydroxyl groups, said compound being a hydroxyl functional monomer selected from the group consisting of 2-hydroxyethylacrylate, 2-hydroxypropyl-acrylate, 2-hydroxyethylmethacrylate, 2-hydroxypropylmethacrylate, allyl alcohol, and vinyl benzyl alcohol.

20. A moulding compound according to claim 1 wherein said modified rubber containing hydroxyl groups is modified with a compound containing hydroxyl groups, said compound being a hydroxyl functional monomer selected from the group consisting of 2-hydroxyethylacrylate, 2-hydroxypropylacrylate, 2-hydroxyethylmethacrylate, 2-hydroxypropylmethacrylate, allyl alcohol and vinyl benzyl alcohol.

* * * * *